United States Patent
Borghi et al.

(10) Patent No.: US 8,807,319 B2
(45) Date of Patent: Aug. 19, 2014

(54) DIVIDER FOR DIVIDING PRODUCTS INTO PARALLEL LANES

(75) Inventors: Davide Borghi, Modena (IT); Stefano Flore, Bologna (IT); Elena Sacchetti, Correggio (IT); Paolo Mignano, Correggio (IT); Roberto Torelli, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 14/114,405

(22) PCT Filed: May 3, 2011

(86) PCT No.: PCT/EP2011/057080
§ 371 (c)(1),
(2), (4) Date: Oct. 28, 2013

(87) PCT Pub. No.: WO2012/149962
PCT Pub. Date: Nov. 8, 2012

(65) Prior Publication Data
US 2014/0048384 A1 Feb. 20, 2014

(51) Int. Cl.
*B65G 37/00* (2006.01)

(52) U.S. Cl.
USPC ........ 198/367; 198/442; 198/459.1; 198/429; 198/457.01

(58) Field of Classification Search
CPC ............ B65G 47/26; B07C 1/02; B07C 1/00; B07C 3/00
USPC ............ 198/429, 426, 727, 456, 457.01, 597, 198/601, 442, 459.1, 367
See application file for complete search history.

(56) References Cited

U.S. PATENT DOCUMENTS

2008/0264759 A1  10/2008  Mignano

FOREIGN PATENT DOCUMENTS

| EP | 1 439 140 A1 | 7/2004 |
| EP | 1 985 558 A1 | 10/2008 |

OTHER PUBLICATIONS

International Search Report (PCT/ISA/210) mailed on Jan. 19, 2012, by the European Patent Office as the International Searching Authority for International Application No. PCT/EP2011/057080.
Written Opinion (PCT/ISA/237) mailed on Jan. 19, 2012, by the European Patent Office as the International Searching Authority for International Application No. PCT/EP2011/057080.

*Primary Examiner* — Ramya Burgess
*Assistant Examiner* — Lester Rushin
(74) *Attorney, Agent, or Firm* — Buchanan Ingersoll & Rooney PC

(57) ABSTRACT

A divider dividing products into parallel lanes comprises a support frame; at least one guide channel for receiving the products, carried by the frame and extending parallel to a longitudinal direction; a fixed first guide connected to the frame and extending parallel to a transversal direction orthogonal to the longitudinal direction; second guide carried by the frame and extending parallel to the longitudinal direction; first actuator for moving the guide channel parallel to the transversal direction; and second actuator for moving one of two telescopically coupled channel portions of the guide channel relative to the other in a direction parallel to the longitudinal direction; the second guide connected to the frame in a fixed position; the first/second actuators comprising a first/second motorized cursor slidably coupled to the first/second guide and connected to the guide channel/one of the two channel portions to move it parallel to the transversal/longitudinal direction.

15 Claims, 5 Drawing Sheets

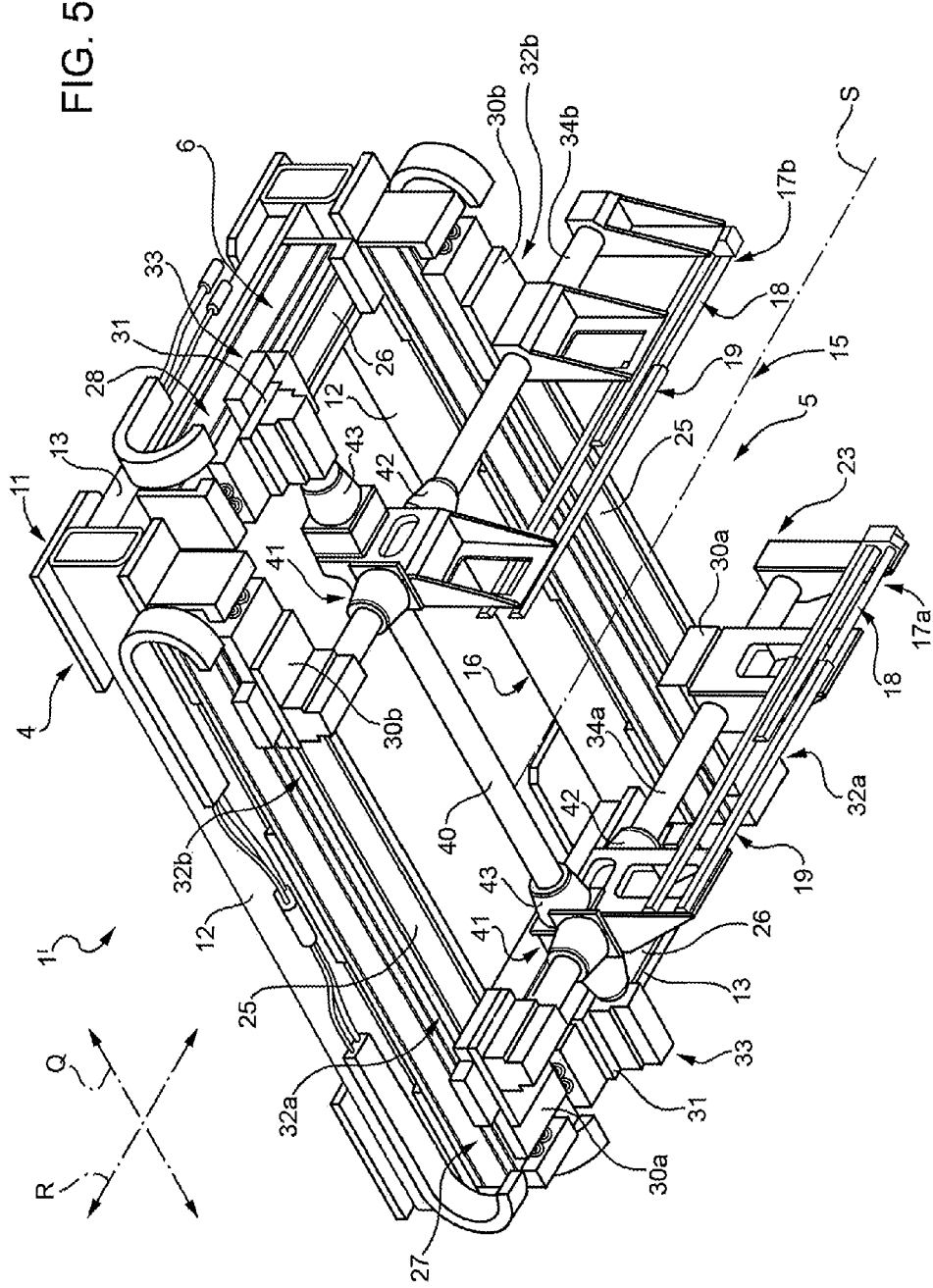

DIVIDER FOR DIVIDING PRODUCTS INTO PARALLEL LANES

TECHNICAL FIELD

The present invention relates to a divider for dividing products into parallel lanes.

The present invention is particularly applicable to conveying machines and systems for conveying, moving and sorting containers or packages, such as containers made of multi-layer, plastic- and/or paper-based, laminated materials, bottles, flacons, glass, sheet metal or aluminium containers, multi-containers packages and so on, typically used in the food and drinks industry.

BACKGROUND ART

As is known, dividers of this sort are generally used upstream of control, selection and packaging systems to form multi-container transport units deposited on pallets.

The products to be divided are normally advanced by a product conveyor and channeled along a single lane up to a work area which precedes a packing or sorting zone where the pallets are formed.

In the work area, a divider is normally used to divide the products arriving along a single lane into a plurality of parallel lanes.

Dividers of this kind are known for instance by EP-A-1985558. The known dividers basically comprise a fixed frame, extending above and along the opposite sides of a horizontal transport plane defined by the product conveyor, a guide channel suspended to the frame and adapted to receive the products advanced by the transport plane in a single lane, and means for moving the guide channel with respect to the frame in order to line up the products in parallel lanes.

In particular, the frame comprises four legs inferiorly joined to one another by respective stiffening bars and superiorly connected, two-by-two, by a first and a second transversal beam extending orthogonally to the legs and to the advancing direction of the products.

The first and second transversal beam are provided, at the top, with respective transversal guide elements slidably supporting a longitudinal support element, from which the guide channel is suspended.

More specifically, the support element extends along a longitudinal direction orthogonal to the transversal beams and the legs and has opposite ends slidably coupled to the respective transversal guide elements. In practice, the support element can move along a transversal direction parallel to the transversal guide elements.

The guide channel extends parallel to the longitudinal direction and inferiorly of the support element; the guide channel comprises two channel portions telescopically coupled to each other along a sliding direction parallel to the longitudinal direction. A first one of the channel portions is rigidly connected to the support element and therefore follows all the movements thereof; the second one of the channel portions is instead able to translate along the sliding direction with respect to the first channel portion.

The means for moving comprise first actuating means for displacing the guide channel parallel to the transversal direction, and second actuating means for displacing the second channel portion relative to the first channel portion along the sliding direction.

The movement of the guide channel parallel to the transversal direction permits to displace the products to the desired destination lanes, whilst the relative movement of the second channel portion with respect to the first channel portion along the sliding direction permits to accompany the products right up to their destinations; this latter movement is made at the same speed as the advancing speed of the products.

The first actuating means comprise a first cursor coupled to a bottom guide surface of the support element in a sliding manner along the above-mentioned longitudinal direction, and a conrod having one end hinged to the first transversal beam and another end hinged to the first cursor; in this way, when the first cursor moves along the support element, the conrod moves the support element along the transversal direction.

The second actuating means comprise a second cursor also sliding along the bottom guide surface of the support element and connected to the second channel portion; as a consequence, sliding of the second cursor in the longitudinal direction along the support element produces the lengthening or the shortening of the guide channel.

The first and second cursor define, together with the support element, a first and a second electric linear motor, respectively. In particular, the support element comprises a plurality of permanent magnets, whilst the first and second cursor are provided with respective coils, which, when supplied with electrical currents, induce respective magnetic fields interacting with the magnetic field generated by the permanent magnets; following the interaction of attraction and repulsion between the magnetic field induced by each coil and the magnetic field created by the permanent magnets, the relative cursor is moved along the support element.

The described solution has the drawback that part of the energy supplied to the first linear motor is used to move the support element and the permanent magnets provided on such support element; in other words, part of the energy supplied to the first linear motor is used to move its stator part and the stator part of the second linear motor. This necessarily produces, on the one hand, a waste of energy and, on the other hand, a limitation of the maximum motion speed of the guide channel for dividing the products in their destination lanes; as a matter of fact, an increase of the production rate requires a corresponding increase of the acceleration capability of the guide channel, which, for a given amount of force impressed by the first linear motor to the assembly formed by the support element and the guide channel, is inversely proportional to the mass in motion.

Moreover, due to the presence of the conrod, the above-indicated known solution has a relatively large plant surface or footprint in relation to the number of lanes in which the products are divided. In particular, the known solution is not suitable for more than four or five lanes.

DISCLOSURE OF THE INVENTION

It is therefore an object of the present invention to provide a divider for dividing products into parallel lanes, which is designed to eliminate the aforementioned drawbacks in a straightforward manner.

Another object of the present invention is to provide a divider for dividing products into parallel lanes, which requires reduced forces for the movements of the guide channel and which is quick to react in acceleration at high production rates.

At least one of these objects is achieved by a divider as claimed in claim 1.

BRIEF DESCRIPTION OF THE DRAWINGS

Two preferred, non-limiting embodiments of the present invention will be described by way of example with reference to the accompanying drawings, in which:

FIG. 5 is a perspective view analogous to the one of FIG. 3 showing a different embodiment of a divider in accordance with the present invention.

BEST MODE FOR CARRYING OUT THE INVENTION

Figure 1:
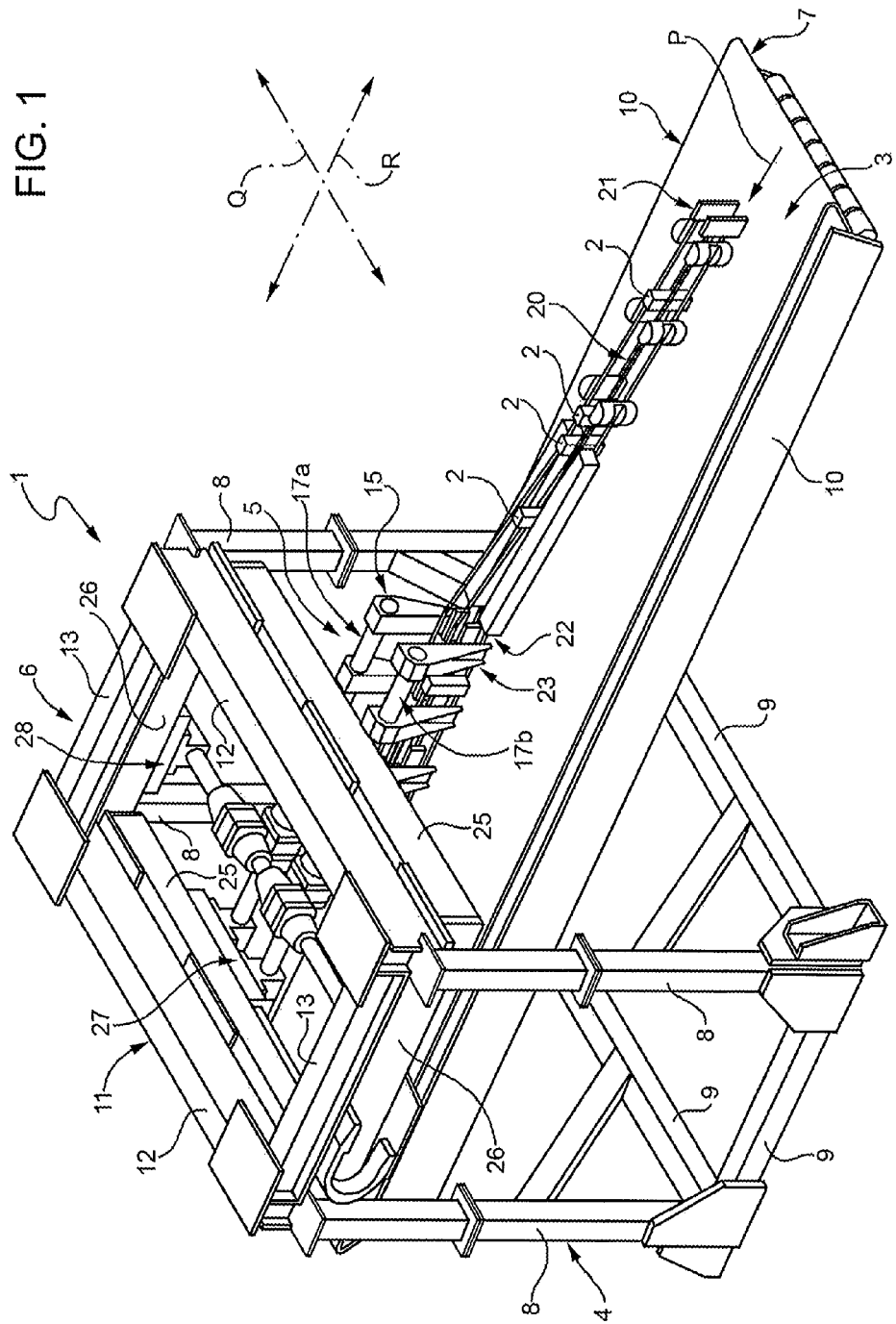
FIG. 1 shows a side perspective view of a divider, in accordance with the present invention, for dividing products into parallel lanes while they are advanced along a transport plane.
Figure 2:
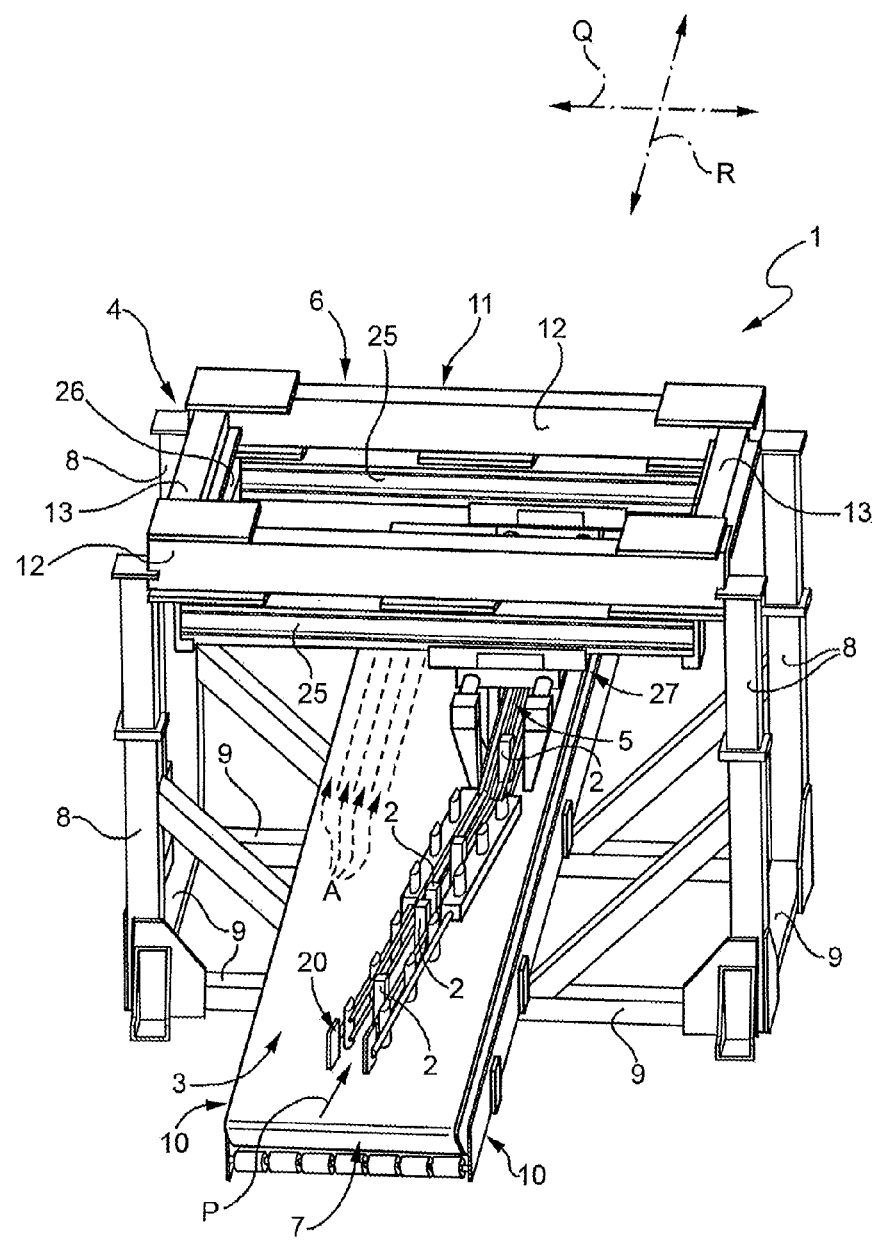
FIG. 2 shows a front perspective view of the FIG. 1 divider and transport plane.

Number 1 in FIGS. 1 and 2 indicates as a whole a divider for dividing products 2 into parallel lanes A (indicated with dotted lines in FIG. 2).

In the example shown, the products 2 are defined by containers made of multilayer, paper-based, laminated material; the divider 1 may be also used for other types of containers or packages, such as bottles, flacons, glass, sheet metal or aluminium containers, multi-container packages and so on.

The products 2 to be divided are advanced by a horizontal transport plane 3 along a path P towards a work area where divider 1 is arranged and operates.

Preferably, the transport plane 3 is defined by an upper horizontal portion of a belt conveyor 7 advancing the products 2 being supplied. Alternatively, the transport plane 3 may be defined by a fixed horizontal panel, on which each product 2 advances as a result of the pushing action performed by the other supplied products, or it may be defined by a surface formed by rollers, whose rotation causes the products 2 to advance.

The divider 1 basically comprises a fixed support frame 4, a guide channel 5 suspended to the frame 4 and adapted to receive the products 2 advanced by the transport plane 3 in a single lane, and means 6 for moving the guide channel 5 with respect to the frame 4 in order to line up the products 2 in parallel lanes A.

In particular, the frame 4 comprises four legs 8 orthogonal to the transport plane 3 and extending, two by two, at the opposite sides of such plane 3; the legs 8 are inferiorly joined to one another by respective stiffening bars 9 so arranged to define a rectangular frame configuration.

The frame 4 further comprises an upper beam system 11 secured to the top ends of the legs 8 and extending parallel to the transport plane 3. In particular, the beam system 11 comprises a pair of first beams 12, parallel to a direction Q transversal with respect to the advancing direction of the products 2 along path P, and a pair of second beams 13 parallel to a direction R orthogonal to direction Q and parallel to respective sides 10 of transport plane 3.

The guide channel 5 extends parallel to the direction R and the lanes A and is inferiorly and movably suspended to the beam system 11, as it will be explained in detail later on; the guide channel 5 comprises two channel portions 15, 16 telescopically coupled to each other along a sliding direction S parallel to the direction R.

The guide channel 5 is formed by two parallel and facing side rails 17a, 17b positioned at a given distance from each other so as to receive the products 2 to be divided in a single lane. Each side rail 17a, 17b is formed by two rail elements 18, 19 telescopically coupled to each other along a direction parallel to the directions R, S. In practice, the rail elements 18 form channel portion 15, whilst the rail elements 19 form channel portion 16.

The products 2 to be divided are supplied in a single lane to channel portion 15, which is arranged upstream of channel portion 16 along path P. In particular, the products 2 reach channel portion 15 of guide channel 5 through a supply channel 20 having one end 21 hinged to a fixed channel (known per se and not shown) and an opposite end 22 hinged to an inlet end 23 of the channel portion 15; the ends 21 and 22 of the supply channel 20 are hinged to axes orthogonal to the transport plane 3 so that the supply channel 20 can rotate, in use, in such plane.

To adapt to the displacements of the guide channel 5 with respect to the frame 4 and, therefore, the fixed channel, the supply channel 20 is telescopic so that it can lengthen or shorten according to the linear distance between the inlet end 23 of the guide channel 5 and the downstream end of the fixed channel.

Advantageously, the means 6 for moving comprise:
first guide elements 25 inferiorly arranged along the respective beams 12 of frame 4 and therefore extending parallel to direction Q;
second guide elements 26 inferiorly arranged along the respective beams 13 of frame 4 and therefore extending parallel to direction R;
first actuating means 27 for moving the guide channel 5 parallel to direction Q through the guiding action of the guide elements 25; and
second actuating means 28 for moving channel portion 16 relative to channel portion 15 along sliding direction S and trough the guiding action of the guide elements 26.

In practice, all the guide elements 25, 26 are connected to the frame 4 in fixed positions.

The actuating means 27 comprise a pair of first motorized cursor elements 30 slidably coupled to the respective guide elements 25 and connected to guide channel 5 to move the latter parallel to direction Q; in a completely analogous manner, the actuating means 28 comprise second motorized cursor elements 31 slidably coupled to the respective guide elements 26 and connected to channel portion 16 to move it relative to channel portion 15 along sliding direction S.

Each cursor element 30, 31 defines, together with the guide element 25, 26 on which it slides, a relative electric linear motor 32, 33. In particular, each guide element 25, 26 comprises a plurality of permanent magnets (not visible in the accompanying Figures), which are aligned along the longitudinal development thereof, whilst the relative cursor element 30, 31 is provided internally with coils (also not visible in the accompanying Figures), which, when supplied with electrical currents, induce a magnetic field interacting with the magnetic field generated by the mentioned permanent magnets; following the interaction of attraction and repulsion between the two magnetic fields, the relative cursor element 30, 31 is moved along the associated guide element 25, 26.

According to another possible embodiment not shown, the coils could be provided on the guide elements 25, 26 and the permanent magnets on the cursor elements 30, 31.

The movement of the guide channel 5 parallel to the direction Q permits to displace the products 2 to the desired destination lanes A, whilst the movement of the channel portion 16 with respect to the channel portion 15 along the sliding direction S permits to accompany the products 2 right up to their destinations; this latter movement is preferably made at the same speed as the advancing speed of the products 2.

Figure 3:
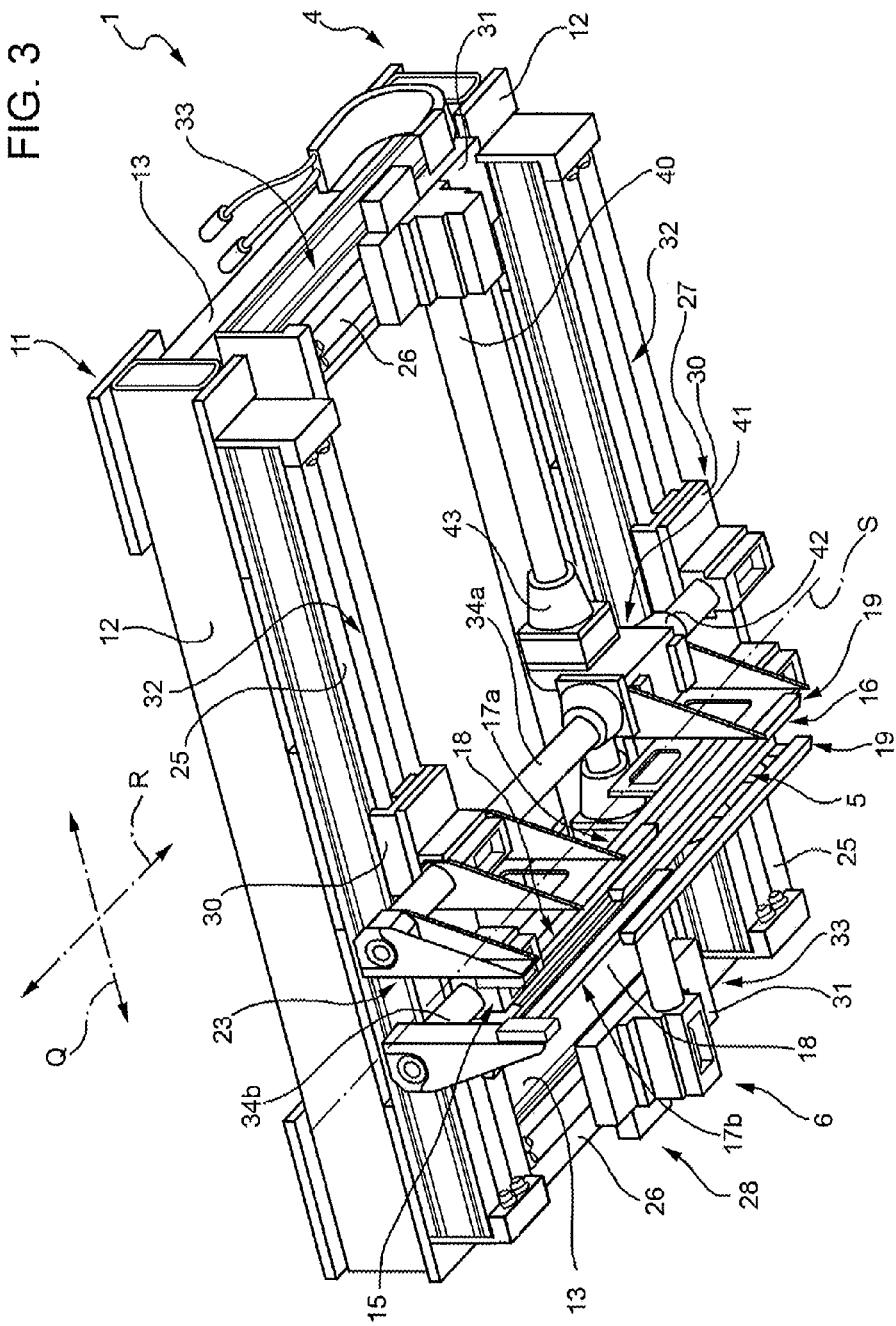
FIG. 3 shows a larger-scale perspective view from the bottom of the FIGS. 1 and 2 divider.
Figure 4:
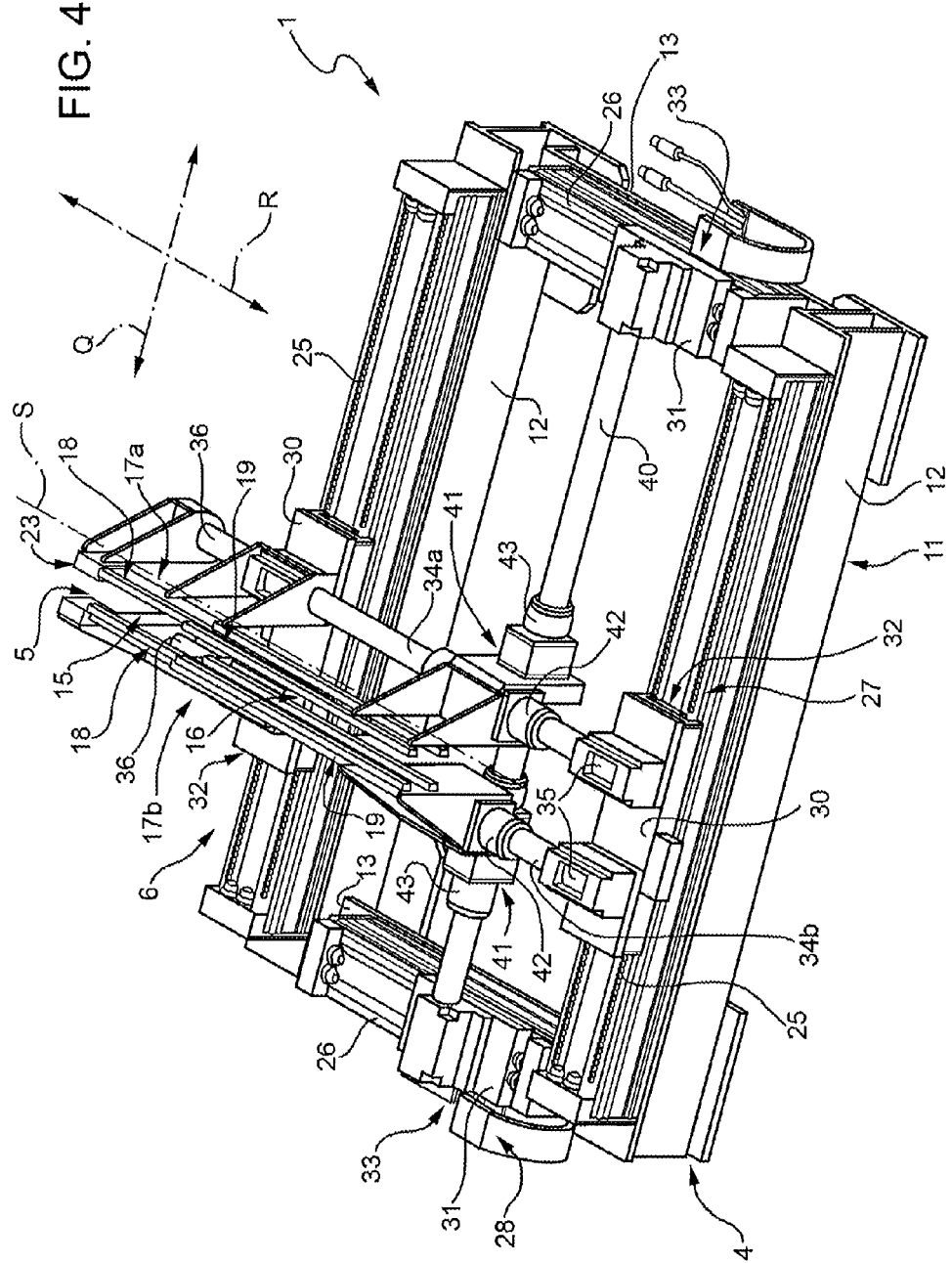
FIG. 4 shows an upside-down perspective view of the FIG. 3 divider.

With particular reference to FIGS. 3 and 4, the side rails 17a, 17b of the guide channel 5 are carried by respective bars 34a, 34b extending parallel to guide elements 26 and direction R and each secured to the cursor elements 30. More specifically, each bar 34a, 34b is secured, at one end portion 35, to one of the cursor elements 30 and, at a position close to the opposite end portion 36, to the other cursor element 30; in this manner, the end portions 36 of bars 34a, 34b protrude from the side of the relative cursor element 30 opposite the side facing the other cursor element 30. In the example shown in FIGS. 3 and 4, the protruding end portions 36 of bars 34a, 34b are located upstream of the end portions 35 along path P.

The rail elements 18 are superiorly connected in a rigid manner to the respective bars 34a, 34b at a region thereof containing protruding end portions 36, whilst the rail elements 19 are superiorly connected to the remaining parts of said bars 34a, 34b in a sliding manner along a direction parallel to directions R, S.

The rail elements 19 are also coupled in a sliding manner onto a further bar 40 extending parallel to guide elements 26 and direction Q and secured, at its opposite ends, to the respective cursor elements 31.

In detail, each rail element 19 is secured onto a support body 41 having a first bushing 42 slidably and coaxially coupled onto the relative bar 34a, 34b, and a second bushing 43 slidably and coaxially coupled onto bar 40.

In use, the products 2 to be divided are fed in a single row to the supply channel 20 and, from here, to the inlet end 23 of guide channel 5.

Once the number of products 2 to be displaced by the divider 1 has engaged the guide channel 5, this is moved towards the destination lane A of such products 2.

In particular, by activating linear motors 32, the cursor elements 30 slide along the respective guide elements 25; the bars 34a, 34b, being secured to the cursor elements 32, follow the movement thereof. In this way, both the side rails 17a, 17b of the guide channel 5 move together with respective bars 34a, 34b in a direction parallel to direction Q. During this movement, the bushings 43 of support bodies 1 slide along bar 40.

The displacements of the guide channel 5 parallel to direction Q ends when the desired destination lane A is reached.

Activation of linear motors 33 produces a sliding movement of the cursor elements 31 along the respective guide elements 26; also in this case, the bar 40, being secured to the cursor elements 31, follows the movement thereof and produces a corresponding movement of channel portion 16 with respect to channel portion 15 so as to accompany the products 2 right up to their final destinations.

More specifically, during the displacement of the bar 40 parallel to direction R, the bushings 42 of support bodies 41 slide along respective bars 34a, 34b.

After having reached its destination, the channel portion 16 returns into the initial or rest position, where it is ready for a further displacement sequence.

Thanks to the described configuration of divider 1, wherein all the guide elements 25, 26 are connected in fixed positions on the frame 4, the mass in motion is relatively low. In particular, the only movable part of each linear motor 32, 33 is represented by the relative cursor element 30, 31; in other words, the displacements of the guide channel 5 never require to move the stator parts of the linear motors 32, 33 with the heavy permanent magnets.

In this way, the acceleration capability of the guide channel 5 is increased with respect to the known solutions and therefore the divider 1 is suitable to operate at high production rates and to divert a reduced number of products 2 per lane A.

This latter feature is very important as it allows to use the so called "butterfly concept" to deliver the products 2 to the destination lanes A. In practice, according to this concept, the lanes A are filled with the products 2 during both the movements of the guide channel 5 from one side 10 of the transport plane 3 to the opposite one and vice versa.

More specifically, the guide channel 5 moves from a first lane A, delimited by one side 10 of the transport plane 3, towards the immediately adjacent lane A and so on up to arrive to the last lane A delimited by the opposite side 10 of the transport plane 3; at this point, the guide channel 5, instead of returning to the first lane A and starting again the same movement sequence, moves from the last lane A to the immediately adjacent one and so on up to arrive to the first lane A.

The butterfly concept permits to avoid the idle times for transferring the guide channel 5 from the last lane A to the first lane A. However, this concept cannot be used with relatively slow movements of the guide channel and therefore with a high number of products diverted per lane, as in this latter case, a uniform diverting flow could not be assured.

Moreover, the described configuration of divider 1 has a relatively small plant surface or footprint in relation to the number of lanes in which the products are divided, since the movement of the guide channel 5 does not require the use of levers rotating in horizontal planes.

Last but not least, having one linear motor 32, 33 for each guide element 25, 26 permits to increase the stiffness of the divider 1 and, hence, the precision of the movements of the guide channel 5.

Number 1' in FIG. 5 indicates as a whole a different embodiment of a divider in accordance with the teachings of the present invention, for dividing products 2 into parallel lanes A; dividers 1 and 1' being similar to each other, the following description is limited to the differences between them, and using the same references, where possible, for identical or corresponding parts.

Divider 1' basically differs from divider 1 by comprising, for each guide element 25, two cursor elements 30a, 30b secured to the respective bars 34a, 34b and, therefore, driving the respective rail sides 17a, 17b of guide channel 5 independently from each other.

In particular, in this case, bar 34a is secured, at its end portion 35, to one of cursor elements 30a and, at a position close to the opposite end portion 36, to the other cursor element 30a; the same applies in an analogous manner to bar 34b, which is secured to cursor elements 30b.

Each cursor element 30a, 30b defines with the permanent magnets of the relative guide element 25 a relative electric linear motor 32a, 32b.

This solution, in addition to the advantages above described in relation to the divider 1, permits to change the width of the guide channel 5, i.e. the distance between the side rails 17a and 17b, without the need of mechanical adjustments and, therefore, without the need of stopping the production.

In practice, it is possible to pass from one format of products 2 to a different one by simply acting on linear motors 32a, 32b so as to place the side rails 17a, 17b at the desired distance from each other.

Moreover, during a stopping phase, by acting independently on the linear motors 32a, 32b, it is possible to reduce the width of the guide channel 5 in a coordinated manner with the motion of the transport plane 3 so as to obtain a better stopping of the flow of the products 2, without any falls of the latter.

Clearly, changes may be made to the dividers 1, 1' as described and illustrated herein without, however, departing from the scope of protection as defined in the accompanying claims.

In particular, the divider 1 may also comprise only one linear motor 32 for the pair of guide elements 25 and one linear motor 33 for the pair of guide elements 26; in this case, one of each pair of cursor elements 30, 31 may be replaced by a sliding bearing.

An analogous solution may be also adopted for the divider 1' with the only difference that one pair of linear motors 32a, 32b is used for the pair of guide elements 25.

The invention claimed is:

1. A divider for dividing into parallel lanes a plurality of products advanced along a transport plane, said divider comprising:
    a support frame;
    at least one guide channel carried by said frame, adapted to receive the products advanced along said transport plane and extending parallel to a longitudinal direction; said guide channel comprising two channel portions telescopically coupled to each other along a sliding direction parallel to said longitudinal direction;
    first guide means connected to said frame in a fixed position and extending parallel to a transversal direction orthogonal to said longitudinal direction;
    second guide means carried by said frame and extending parallel to said longitudinal direction;
    first actuating means for moving said guide channel parallel to said transversal direction through the guiding action of said first guide means; and
    second actuating means for moving a first one of said channel portions relative to a second one of said channel portions parallel to said longitudinal direction and trough the guiding action of said second guide means;
    wherein said second guide means are connected to said frame in a fixed position;
    in that said first actuating means comprise first motorized cursor means slidably coupled to said first guide means and connected to said guide channel to move the guide channel parallel to said transversal direction;
    and in that said second actuating means comprise second motorized cursor means slidably coupled to said second guide means and connected to said first channel portion to move it relative to the second channel portion and parallel to said longitudinal direction.

2. A divider as claimed in claim 1, wherein said longitudinal direction is parallel to said lanes, and wherein said guide channel passes from one lane to another by moving parallel to said transversal direction.

3. A divider as claimed in claim 1, wherein said longitudinal and transversal directions are parallel to said transport plane.

4. A divider as claimed in claim 1, wherein said first guide means and said first cursor means define at least one first electric linear motor, and wherein said second guide means and said second cursor means define at least one second electric linear motor.

5. A divider as claimed in claim 4, wherein said first and second guide means are provided with permanent magnets, and wherein said first and second cursor means comprise respective coils supplied with electrical currents to induce respective magnetic fields interacting in use with the magnetic fields generated by the permanent magnets of the first and second guide means.

6. A divider as claimed in claim 1, wherein said first guide means comprise two first guide elements arranged parallel to each other and to said transversal direction, and wherein said second guide means comprise two second guide elements arranged parallel to each other and to said longitudinal direction.

7. A divider as claimed in claim 6, wherein said first and second guide elements are arranged so as to define a quadrangular frame configuration.

8. A divider as claimed in claim 1, wherein said guide channel comprises a pair of side rails parallel to said longitudinal direction and spaced apart from each other.

9. A divider as claimed in claim 8, wherein said first cursor means comprise at least one first cursor element connected to both said side rails of said guide channel.

10. A divider as claimed in claim 9, wherein said first cursor means comprise at least two independent first cursor elements slidably coupled to the respective first guide elements, and wherein each one of said cursor elements is connected to both said side rails of said guide channel.

11. A divider as claimed in claim 8, wherein said first cursor means comprise at least two independent first cursor elements, each connected to a relative one of said side rails of said guide channel.

12. A divider as claimed in claim 11, wherein said first cursor means comprise at least four independent first cursor elements slidably coupled, two by two, to the respective first guide elements, and wherein each of said side rails is connected to two of said first cursor elements in turn slidably coupled to the respective first guide elements.

13. A divider as claimed in claim 1, wherein said second cursor means comprise at least one second cursor element connected to said first channel portion.

14. A divider as claimed in claim 13, wherein said second cursor means comprise at least two independent second cursor elements slidably coupled to the respective second guide elements, and wherein said first channel portion is connected to both said second cursor elements.

15. A divider as claimed in claim 8, wherein said side rails are carried by respective bars extending parallel to said longitudinal direction and secured to said first cursor means;
    wherein the parts of said side rails delimiting said second channel portion are secured to the respective bars, and the parts of said side rails delimiting said first channel portion are coupled in a sliding manner to the respective bars in a direction parallel to said longitudinal direction; and
    wherein the parts of said side rails delimiting said first channel portion are also coupled in a sliding manner onto a further bar extending parallel to said transversal direction and secured to said second cursor means.

* * * * *